(12) United States Patent
Jinguo et al.

(10) Patent No.: US 7,871,583 B2
(45) Date of Patent: Jan. 18, 2011

(54) PROCESS FOR RECOVERY OF SILICA FOLLOWED BY ALUMINA FROM COAL FLY ASH

(75) Inventors: Qin Jinguo, Shuozhou (CN); Gu Songqing, Shuozhou (CN)

(73) Assignee: Pingshuo Industrial Ltd, Shuozhou, Shanxi Province (CN)

( * ) Notice: Subject to any disclaimer, the term of this patent is extended or adjusted under 35 U.S.C. 154(b) by 0 days.

(21) Appl. No.: 11/995,912

(22) PCT Filed: Aug. 16, 2007

(86) PCT No.: PCT/CN2007/002475

§ 371 (c)(1),
(2), (4) Date: Apr. 2, 2008

(87) PCT Pub. No.: WO2008/119212

PCT Pub. Date: Oct. 9, 2008

(65) Prior Publication Data

US 2010/0119426 A1     May 13, 2010

(30) Foreign Application Priority Data

Apr. 3, 2007    (CN) .......................... 2007 1 0061662
Aug. 7, 2007    (CN) .......................... 2007 1 0062534

(51) Int. Cl.
*C22B 21/04*     (2006.01)

(52) U.S. Cl. ...................................................... 423/131

(58) Field of Classification Search ........................ None
See application file for complete search history.

(56) References Cited

PUBLICATIONS

Lin et al, the complex chemical treatment of alumina-silica-containing materials, 1998, journal of materials synthesis and processing, vol. 6 No. 1.*
Blanco et al, variation in fly ash properties with milling and acid leaching, 2005, fuel, 84, pp. 89-96.*

* cited by examiner

*Primary Examiner*—Melvin C Mayes
*Assistant Examiner*—Stefanie Cohen
(74) *Attorney, Agent, or Firm*—Neifeld IP Law, PC

(57) ABSTRACT

A process for recovery of silica and alumina from fly ash, in which, Si is leached out from the fly ash in the form of $Na_2SiO_3$ using a NaOH solution of NaOH >40% (w/w), followed by separation to obtain a $Na_2SiO_3$ solution and a residue having Al—Si ratio $\geq 2$; vaporizing the solution to obtain $Na_2SiO_3$ solutions of various concentrations, or producing silica by carbonation, and producing $Al_2O_3$ by prior art methods from residues obtained after alkali-leaching, ultimately producing filler or cement from the residue after the recovery of Al. The method permits recovery of $Al_2O_3$ directly from fly ash by removing Si before recovering the Al, which raises the Al—Si ratio of the residue after alkali-leaching and thus simplifies the recovery of $Al_2O_3$ and raises the rate of Al recovery from fly ash. The invention further includes calcining high Al coal gangue, kaolinite and middle-low-class bauxite at 900-1100° C.

10 Claims, No Drawings

PROCESS FOR RECOVERY OF SILICA FOLLOWED BY ALUMINA FROM COAL FLY ASH

CROSS-REFERENCE TO RELATED APPLICATIONS

This is a 371 national stage application of international application no. PCT/CN2007/002475, filed Aug. 16, 2007, which claims priority to Chinese application No. 200710061662.X, filed Apr. 3, 2007, and Chinese application No. 200710062534.7, filed Aug. 7, 2007, each of which is incorporated by reference herein.

FIELD OF THE INVENTION

The present invention refers to fine utilization of fly ash, and particularly to a process for recovery of silica and alumina from fly ash, and more specifically refers to a process in which silica is firstly recovered from fly ash, remaining an Al—Si ratio $\geq 2$, then metallurgical alumina is produced with prior art, the residue of which is used as a filler or to produce cement.

BACKGROUND OF THE INVENTION

Large amounts of fly ash are discharged from power plants in which coal is burned that causes severe pollution and damage to agricultural and natural ecology around the plants. It is therefore now a project that needs to be solved urgently to utilize the fly ash.

Fly ash is also a mineral resource. It generally contains about 15-40% $Al_2O_3$ and mostly above 40% $SiO_2$, even above 40% $Al_2O_3$ and about 50% $SiO_2$ in high Al fly ash. More than 3 hundred million tons of fly ash are discharged from lire power electrical plant each year in China, wherein 1 hundred million ton is no less than high aluminum fly ash. If resources from high aluminum fly ash that is being abandoned can be fully recovered, more than 30 million tons of $Al_2O_3$ can be produced each year, which is far higher than the total production of $Al_2O_3$ today in China Bauxite stores in China are only $\frac{1}{10}$ of the world average stores. It is therefore significant and important for the sustainable development of an aluminum industry in China to develop and use the resources of high Al fly ash.

The method of recovering $Al_2O_3$ from fly ash can be divided into acid methods and alkali methods. With acid processing, damage to $SiO_2$ can be avoided while Al oxide is efficiently recovered from fly ash. But when leaching $Al_2O_3$, the disadvantage of acid processing is that a number of soluble impurities such as Fe, Ti, Mg contained in the fly ash are introduced into the solution, so post-treatment must be added; another disadvantage is that apparatus of the acid method needs better acid-corrosion-resistance, so it is rather difficult to make the reaction facility; Another disadvantage regarding the acid process for recovery of $Al_2O_3$ from fly ash includes high energy consumption and the necessary cost for environmental protection.

In the 1960's, a soda lime sintering method was used to recover $Al_2O_3$ from fly ash in Poland and an experimental plant which produced ten thousand tons of $Al_2O_3$ and 100 thousand tons of cement each year was built up there. In the 1980's, Metallurgy Institute of Anhui Province and Hefei Cement Institute in China declared the achievement of recovering $Al_2O_3$ from fly ash by sintering limestone and dissolving $Na_2CO_3$ and producing cement with the residue. This achievement passed the expert examination in March 1982. The process of recovering $Al_2O_3$ from fly ash by soda lime sintering, and producing cement with the residue studied by Building Material Institute of Ningxia Autonomous District was examined by Technology Committee of Ningxia Autonomous District in September 1987. The examination of the project entitled "Industrialization of recovery $Al_2O_3$ and producing cement from fly ash", which was researched and developed by Mengxi high-novel technology group LTD., was held in Inner Mongolia Autonomous Region S. & T. Department in December 2004, and a pilot study of nearly 5000 ton-class was completed by the group itself. But the process of treating high Si and Al-containing fly ash by alkali methods normally has such disadvantages as high complexity, high time consumption, large quantities of processing materials, large investment of facility, high energy consumption and high cost. Furthermore the amount of residue is several times that of fly ash; the market coverage of cement made from the residue is limited; the comprehensive economic efficiency and the level of synthetic utilization are low. All of these factors inhibit the use of alkali methods in synthetic utilization of fly ash.

Today 90% of the $Al_2O_3$ in the world is produced by the Bayer Process. But the Bayer Process requires a relatively high Al—Si ratio i.e. $\geq 7$ in raw ore. In order to produce $Al_2O_3$ with bauxite of 3<Al—Si-ratio <7, which is economically unfavorable if Bayer Process is directly used, a sintering treatment of ore powder is needed with added alkali and Calcium or complex methods to recover $Al_2O_3$; resulting in $20-50/ton higher cost than that of the Bayer Process. The Al—Si ratio of fly ash is generally less than 1, which is far from the conditions on which industry-facilities using the Bayer Process can be used to recover $Al_2O_3$ directly.

SUMMARY OF THE INVENTION

An object of the present invention to provide a process for recovering silica and alumina from fly ash, in which silica is firstly recovered from the fly ash to give a residue having an Al—Si ratio $\geq 2$, then metallurgical alumina is produced using conventional methods. A residue can be used to produce filler or cement.

Another object of the invention is to provide a process for recovering silica and alumina from coal fly ash, comprising: a) alkali-leaching Si from fly ash at 70-150° C. with a NaOH solution of concentration >40% (w/w), then separating a $Na_2SiO_3$ solution from a residue having Al—Si ratio $\geq 2$; b) concentrating the $Na_2SiO_3$ solution by vaporization, or obtaining silica by carbonation; and c) producing $Al_2O_3$ from the residue having Al—Si ratio $\geq 2$.

DETAILED DESCRIPTION OF PREFERRED EMBODIMENTS

Activation of fly ash can be done by roasting, acid-steeping or alkali-steeping. Suitable roasting conditions are roast-activation for 1-1.5 h at a temperature of $\leq 950°$ C. $H_2SO_4$ solution of any concentration can be used to steep the fly ash, and either under ambient or controlled temperature. On the other hand, a suitable alkali solution used to steep fly ash is 5-20% (w/w) NaOH solution.

Conventional methods used to produce $Al_2O_3$ from the residue obtained after alkali-leaching include soda lime sintering methods or limestone sintering methods, in which $Al(OH)_3$ is produced by clinker-sintering, clinker-leaching-out, desilication of sodium aluminate solution and carbonation-decomposing and followed by producing $Al_2O_3$ by roasting at high-temperature. After leaching out Si from fly ash, in the form of sodium aluminate by using NaOH solution with a concentration >40% (w/w), the leaching solution is diluted with water to facilitate separation of the sodium aluminate solution and the residue after alkali-leaching.

When producing silicon dioxide by a carbonating method from sodium aluminate solution, the obtained sodium aluminate solution can be basified with CaO or $Ca(OH)_2$, evaporating the dilute NaOH solution obtained to arrive at a concentration required for alkali-leaching in order for recycle-using.

The method according to the present invention breaks through traditional theory regarding recovery and desilication from high Si—Al-material, sets forth a novel process for producing $Al_2O_3$ by using high-Si—Al resources such as high-Al fly ash, in which silicon dioxide is recovered before recovery of $Al_2O_3$.

In comparison with the prior art, the present invention has the following advantages: 1) Prior art in the field of treatment of fly ash is only recovers $Al_2O_3$ from fly ash, with the remaining residue all used to produce cement, and with a low recovery rate of $Al_2O_3$ and low additional value of production. In contrast, the present invention recovers Si from fly ash by producing a $Na_2SiO_3$ solution and white carbon black, which have broad usage and significantly raise the added value of production, extending the industry chain of Si contained resources. Efficient recovery of Si from fly ash causes the Al—Si ratio of the residue after alkali-leaching to raise, making it a low-cost material for producing $Al_2O_3$, which raises the use value of fly ash. 2) The residue created after producing $Al_2O_3$ can be used to make either filler or cement. 3) All of the liquid phases of the process can be efficiently recycled, and no residue or harmful gas are released during the process. 4) The process is simple, with low capital investment, low operational cost and high added value, by which substantial elements of the fly ash can be fully used. It is a prosperous industry method for utilization of fly ash resources.

Example 1

After roasting 100 kg of fly ash that has an average particle diameter $\leq 30$ μm and contains $Al_2O_3 \geq 40\%$ below the temperature of 400° C., it was put into a reaction kettle, adding into it 150 L of 80% NaOH solution and immersing for 1 h at 115-125° C. with stirring, then diluting by adding 200 L of water or thin alkali solution, to obtain 310 L of $Na_2SiO_3$ solution with 118 g/L $SiO_2$ and 65 kg residue after alkali-leaching with a Al—Si ratio of about 3.25. After diluting it from 118 g/L to 60 g/L, $Na_2SiO_3$ solution was moved into a carbonating kettle. It was filled with $CO_2$ gas, followed by carbonating with stirring at 70-85° C. until pH=9. Then carbonating was stopped followed by filtering and separating, to obtain about 35 kg of white carbon black, which contains >98.5% $SiO_2$. The carbonated filtered solution was mixed with CaO. After basifying at 75° C., it was evaporated till the concentration readied the concentration required by the alkali-leaching ash. Then it was sent back to the alkali-leaching steps for recycle use.

A slurry was produced by adding Ca according to $CaO:SiO_2 \leq 2$ and by adding alkali according to $Na_2O:Al_2O_3+Fe_2O_3 \geq 1:1.1$ into desilicated residue after alkali-leaching. It was calcined at 950-1350° C. to get clinker. The clinker was dissolved and steeped with thin alkali solution, followed by separating solid from liquid. The desilicated solution was moved into a carbonation kettle, followed by filling $CO_2$ gas to carry out carbonized precipitation to precipitate $Al(OH)_3$. Filtering and separating was carried out when the solution was at a pH=8, to obtain 34 kg $Al(OH)_3$. After cleaning, $Al(OH)_3$ could be calcined into $Al_2O_3$. Residue after Al-recovery could be used to obtain filler with excellent performance by conventional technical treatment, or could be used to produce cement by conventional treatment.

Example 2

100 Kg of fly ash that had been roasted at 200° C. and had an average particle diameter $\leq 30$ μm and contained $Al_2O_3 \geq 41\%$ was put into a reaction kettle, followed by adding 160 L of 70% NaOH solution and boiled immersing for 2 h at 120° C. with stirring, then diluting by adding 200 L of water or thin alkali solution, resulting in 300 L $Na_2SiO_3$ solution containing 113 g/L $SiO_2$ and 66 kg of residue after alkali-leaching with an Al—Si ratio $\geq 3$. The post-treatment of sodium carbonate solution and residue after alkali-leaching was the same as in Example 1.

Example 3

100 Kg fly ash that had a particle diameter $\leq 50$ μm was roasted at 850° C., followed by moving it into a alkali-leaching kettle after removing C. 220 L of 60% NaOH solution was subsequently added into it, followed by immersing for 2.5 h at 125° C. with stirring, and then diluting by adding 200 L of thin alkali solution, resulting in 350 L of $Na_2SiO_3$ solution containing 110 g/L $SiO_2$ and about 65 kg of residue after alkali-leaching with a Al—Si ratio >4 obtained simultaneously. The post-treatment of sodium carbonate solution and residue after alkali-leaching was the same as in Example 1.

Example 4

100 Kg of wet fly ash released from a power plant was directly bumped into a ball mill and ground into particles with diameter $\leq 30$ μm. Water content in the ash was measured. A solution of 70% (w/w) NaOH was then prepared, followed by immersing the fly ash for 2 h at 120-130° C. with stirring, and then diluting by adding 200 L of thin alkali solution. Obtained was 310 L of $Na_2SiO_3$ solution containing 103 g/L $SiO_2$ and about 66 kkKg of residue after alkali-leaching with a Al—Si ratio $\geq 3$. The post-treatment of sodium carbonate solution and residue after alkali-leaching is the same to Example 1.

Example 5

1 Ton of fly ash was ground and iron removed by magnetic separation then subsequently steeped in 10% $H_2SO_4$ solution for 240 h at ambient temperature. After filtering out the steeping solution, the remainder was washed until reaching pH=5, resulting in activated fly ash. The activated fly ash was moved into a reaction kettle, in which 1.6 t of 75% NaOH solution was added followed by boiling immersed for 2 h at 100° C. with stirring than diluting by adding 2.5 t water. The filtered solution was put into a carbonating kettle, in which $CO_2$ gas was filled subsequently. Carbonation with stirring was carried out at 80° C. till pH=9. After stopping of the carbonation filtering and separating was carried out, resulting in 420 kg of silica. Measurement showed that the purity is 98.7%. The post-treatment of sodium carbonate solution and residue after alkali-leaching was the same as Example 1.

Example 6

1 Ton fly ash was ground and iron was removed by magnetic separation. It was subsequently steeped in 18% NaOH solution for 150 h at ambient temperature. Activated fly ash was obtained after filtering out the steeping solution. The activated fly ash was moved into reaction kettle, in which 2 t of 65% NaOH solution was added subsequently and followed by boiling immersed for 3 h at 110° C. with stirring, then diluting by adding 2.5 t water. The carbonating kettle was filled with filtering solution and $CO_2$ gas. Carbonation with stirring was carried out at 80° C. till pH=9. After stopping of the carbonation, filtering and separating was carried out, resulting in 400 kg of silica. Measurement showed that the purity was 98.5%. The post-treatment of dodium carbonate solution and residue after alkali-leaching was the same as Example 1.

Example 7

1 Ton fly ash was ground and iron-removed by magnetic separation. It was subsequently steeped in 30% $H_2SO_4$ solution for 480 h at normal temperature, after filtering out the steeping solution, the remainder was washed until pH=5, resulting in activated fly ash. The activated fly ash was moved into reaction kettle and added with 1.6 t of 75% NaOH solution, and followed by boiled immersing for 3 h at 105° C. with stirring, then diluting by adding 2.5 t water. Into the carbonating kettle was filled with filtering solution and $CO_2$ gas. Carbonation with stirring was carried out at 80° C. till pH=9. After stopping of the carbonation, filtering and separating was carried out, resulting in 420 kg of silica. Measurement showed that the purity was 98.7%. The post-treatment of Sodium carbonate solution and residue after alkali-leaching was the same as Example 1.

The utility of the present invention is seen in the advantages of simplicity, low capital investment, low operating cost and high added-value making utilization of fly ash a economical resource.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. A process for recovering silica and alumina from coal fly ash, comprising:
    a) alkali-leaching Si from fly ash at 70-150° C. with a NaOH solution of concentration >40% (w/w), then separating a $Na_2SiO_3$ solution from a residue having Al—Si ratio $\geq 2$;
    b) concentrating the $Na_2SiO_3$ solution by vaporization, or obtaining silica by carbonation; and
    c) producing $Al_2O_3$ from the residue having Al—Si ratio $\geq 2$.

2. The process of claim 1, wherein the fly ash is activated by one or more of the following steps: a) roasting-activating the fly ash, b) steeping fly ash in $H_2SO_4$ solution, c) steeping fly ash in NaOH solution.

3. The process of claim 1, wherein the fly ash is a high Al coal gangue, a kaolinite or middle-low-class bauxite and further comprises activating the fly ash at 900-1100° C.

4. The process of claim 2, wherein the fly ash is a high Al coal gangue, a kaolinite or middle-low-class bauxite, and further comprises activating the fly ash at 900-1100° C.

5. The process according to claim 1, further comprising producing filler or cement using the residue created after producing Al2O3.

6. The process according to claim 2, further comprising producing filler or cement using the residue created after producing Al2O3.

7. The process of claim 2, wherein the fly ash is a high Al coal gangue, a kaolinite or middle-low-class bauxite and said roasting-activating is carried out under the temperature of $\leq 950$.

8. The process of claim 2, wherein said $H_2SO_4$ solution is a $H_2SO_4$ solution of 10-30% (w/w) concentration.

9. The process of claim 2, wherein said NaOH solution is a 5-20% (w/w) NaOH solution.

10. The process of claim 1, wherein $Na_2CO_3$ solution is basified with CaO or $Ca(OH)_2$ to produce a NaOH solution for recycle-use.

* * * * *